United States Patent [19]

Salmon et al.

[11] Patent Number: 4,850,518

[45] Date of Patent: Jul. 25, 1989

[54] SPARE WHEEL CARRIER

[75] Inventors: Roy P. Salmon, Bedfordshire, England; Ernest E. Cockburn, Rochester Hills, Mich.

[73] Assignee: General Motors Corporation, Detroit, Mich.

[21] Appl. No.: 182,635

[22] Filed: Apr. 18, 1988

[30] Foreign Application Priority Data

Sep. 17, 1987 [GB] United Kingdom ............... 8721930

[51] Int. Cl.⁴ ............................................... B62D 43/02
[52] U.S. Cl. ............................. 224/42.23; 224/42.28; 414/463
[58] Field of Search ............... 224/42.06, 42.07, 42.08, 224/42.12, 42.21, 42.23, 42.41; 414/463, 465, 466

[56] References Cited

U.S. PATENT DOCUMENTS

| | | | |
|---|---|---|---|
| 2,354,943 | 8/1944 | Clark | 414/463 |
| 2,354,944 | 8/1944 | Clark | 414/463 |
| 2,494,411 | 1/1950 | Simi | 414/465 |
| 2,755,948 | 7/1956 | Winkle | 414/466 |
| 2,765,091 | 10/1956 | Weiss | 414/466 |
| 3,648,867 | 3/1972 | Beavers . | |
| 3,698,609 | 10/1972 | Lund | 224/42.23 X |
| 3,912,099 | 10/1975 | Liebermann . | |
| 4,095,709 | 6/1978 | Eller | 414/466 |
| 4,155,472 | 5/1979 | Dansbury | 414/466 |

FOREIGN PATENT DOCUMENTS

| | | | |
|---|---|---|---|
| 2725611 | 12/1978 | Fed. Rep. of Germany ... | 224/42.23 |
| 2757657 | 6/1979 | Fed. Rep. of Germany ... | 224/42.23 |
| 201925 | 11/1967 | U.S.S.R. | 224/42.21 |
| 0709451 | 1/1980 | U.S.S.R. | 414/463 |
| 1054172 | 11/1983 | U.S.S.R. | 224/42.12 |
| 1063684 | 12/1983 | U.S.S.R. | 224/42.12 |
| 352223 | 7/1931 | United Kingdom | 224/42.21 |
| 720734 | 12/1954 | United Kingdom | 224/42.21 |
| 1366805 | 9/1974 | United Kingdom . | |
| 2000478 | 1/1979 | United Kingdom . | |
| 2022532 | 12/1979 | United Kingdom . | |

*Primary Examiner*—Ernest G. Cusick
*Attorney, Agent, or Firm*—Edward J. Biskup

[57] ABSTRACT

A spare wheel carrier for a motor vehicle comprising a support member on which a spare wheel can be secured and which is pivotable about a pivot axis between a stored position underneath the motor vehicle and a predetermined position located more than 90° from the stored position. A resilient member is secured at one end to the motor vehicle and, at its opposite free end, carries a pivot for the pivot axis of the support member. The resilient member is biased at its free end in a direction against an abutment surface. A drive member is pivotably secured to the motor vehicle at one end and is pivotably secured to the support member at the other end. The drive member is reversibly actuable to pivotally move the support member. Pivot limit structure is provided for limiting the angle of movement of the support member relative to the resilient member about the pivot axis to a predetermined angle after the support member has passed through the predetermined position. The arrangement is such that the drive member pivotally moves the support member from its stored position until after the support member has passed through the predetermined position when the pivot limit structure prevents further pivotal movement and further actuation of the drive member causes movement of the free end of the resilient member away from the abutment surface to move the support member back into a position located between the stored position and the predetermined position.

7 Claims, 3 Drawing Sheets

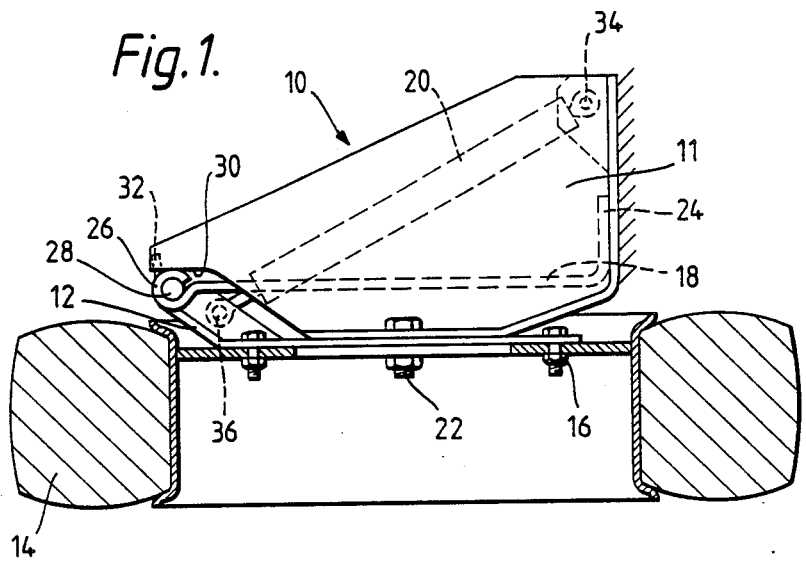
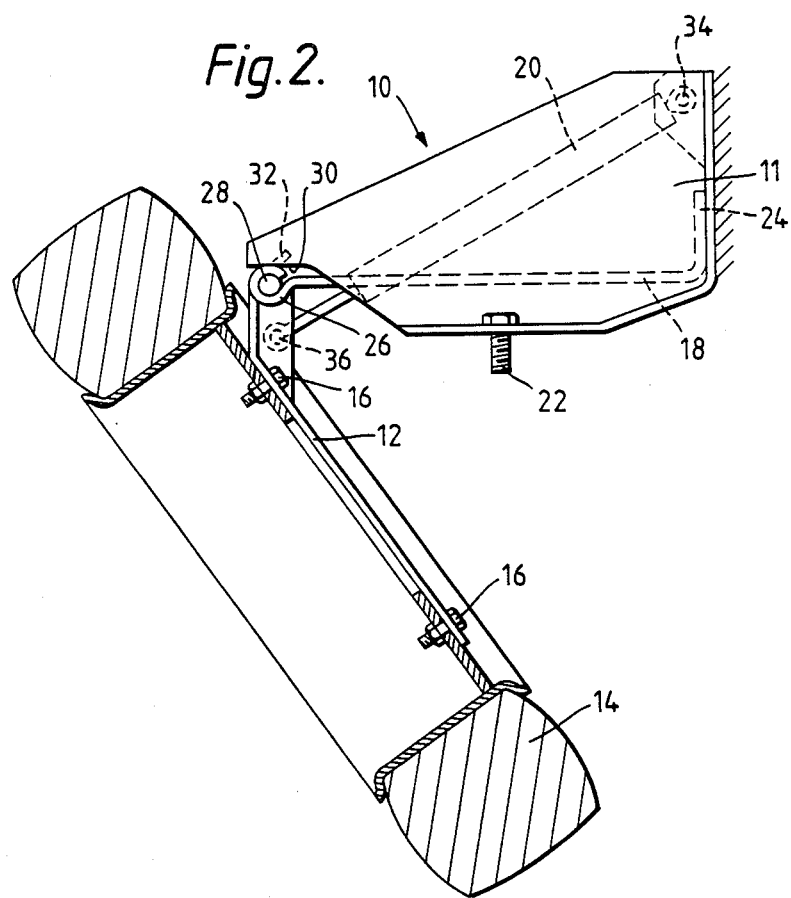

SPARE WHEEL CARRIER

This invention relates to a spare wheel carrier for a motor vehicle, and in particular to a spare wheel carrier for a motor vehicle in which the spare wheel can be stored underneath the motor vehicle, and can be swung between this stored position and a substantially vertical plane for removal and/or replacement of the spare wheel.

BACKGROUND OF THE INVENTION

Examples of arrangements for storing and deploying spare wheels in this way are known from GB patent application Nos. 2000478A and 2022532A. In both these known arrangements the spare wheel is secured to a support member which is pivotably mounted at one end on the motor vehicle and which can pivot about a pivot axis between a substantially horizontal plane and a substantially vertical plane. In both these arrangements, the pivot axis is fixed relative to the motor vehicle whilst the support member is swinging. In GB No. 2000478A, no provision is made for adjusting the height of the support member relative to the ground or the motor vehicle when in the substantially vertical plane. In GB No. 2022532A, such a provision is made, however this is only to allow for adjusting the height of the support member relative to the motor vehicle. Neither of these known arrangements take into account the possible variations in height between the underneath of the motor vehicle and the surface of the ground due to variations in the loading of the motor vehicle and/or variations in the terrain of the surface of the ground.

It is an object of the present invention to provide an improvement to the above mentioned known arrangements.

SUMMARY OF THE INVENTION

To this end, a spare wheel carrier in accordance with the present invention comprises a support member on which a spare wheel can be secured and which is pivotable about a pivot axis between a stored position underneath the motor vehicle and a substantially vertical plane; a resilient member which can be secured at one end to the motor vehicle and which, at its opposite free end, carries a pivot for the pivot axis of the support member, the resilient member being biassed at its free end in a substantially upward direction against an abutment surface when the support member is in its stored position; a drive member which can be pivotably secured to the motor vehicle at one end and which is pivotably secured to the support member at the other end, the drive member being reversibly actuable to move the support member about its pivot axis relative to the resilient member; and pivot limit means for limiting the angle of movement of the support member relative to the resilient member about the pivot axis to a predetermined angle after the support member has passed through a substantially vertical plane, the arrangement being such that the support member can be moved from its stored position by actuation of the drive member in a direction which causes the support member to pivot about its pivot axis through the substantially vertical plane until the pivot limit means prevents further pivotal movement of the support member relative to the resilient member, further actuation of the drive member in the same direction causing movement of the free end of the resilient member in a substantially downward direction away from the abutment surface against the bias of the resilient member to move the support member into the substantially vertical plane, and such that actuation of the drive member in the opposite direction causes reversal of the movement of the free end of the resilient member and of the support member.

Preferably, the stored position of the support member defines a substantially horizontal plane.

The drive member is preferably a double-acting hydraulic ram. Alternatively, the drive member may be a pneumatically or a mechanically operable device.

Preferably, the resilient member is defined by a pair of quarter elliptic leaf springs. In this case, a cylindrical rod preferably extends between the free ends of the quarter elliptic leaf springs, the support member being pivotally mounted on the cylindrical rod which thereby defines the pivotal axis of the support member. Alternatively, the resilient member may comprise torsion bars, or coil or rubber springs, with linkage members which support the pivot for the pivot axis of the support member. As a further alternative, the resilient member may comprise a self-regulating air spring.

The pivot limit means is preferably defined by a stop member on the support member which can engage the resilient member. Alternatively, the pivot limit means may be defined by a chain or other flexible non-extensible member which extends between the support member and the motor vehicle.

Preferably, the support member can be secured in the stored position by bolts and/or a resilient catch.

The present invention facilitates the use of a single drive member to achieve both angular and vertical articulation of the support member in a single controlled motion. The present invention has the advantage that it allows for variations in the height between the underneath of the motor vehicle and the surface of the ground due to variations in the loading of the motor vehicle and/or due to the terrain of the surface of the ground. The present invention has particular application for motor vehicles having heavy wheels in that presentation of the spare wheel in a substantially vertical plane is far easier for the vehicle operator than when the spare wheel is presented horizontally or at an acute angle to the ground.

BRIEF DESCRIPTION OF THE DRAWINGS

The present invention will now be described, by way of example, with reference to the accompanying drawings, in which:

FIG. 1 is a side view of a spare wheel carrier in accordance with the present invention, with the support member in its stored position;

FIG. 2 is a side view of the spare wheel carrier shown in FIG. 1 with the support member moved from its stored position;

DESCRIPTION OF THE PREFERRED EMBODIMENT

Figure 3:
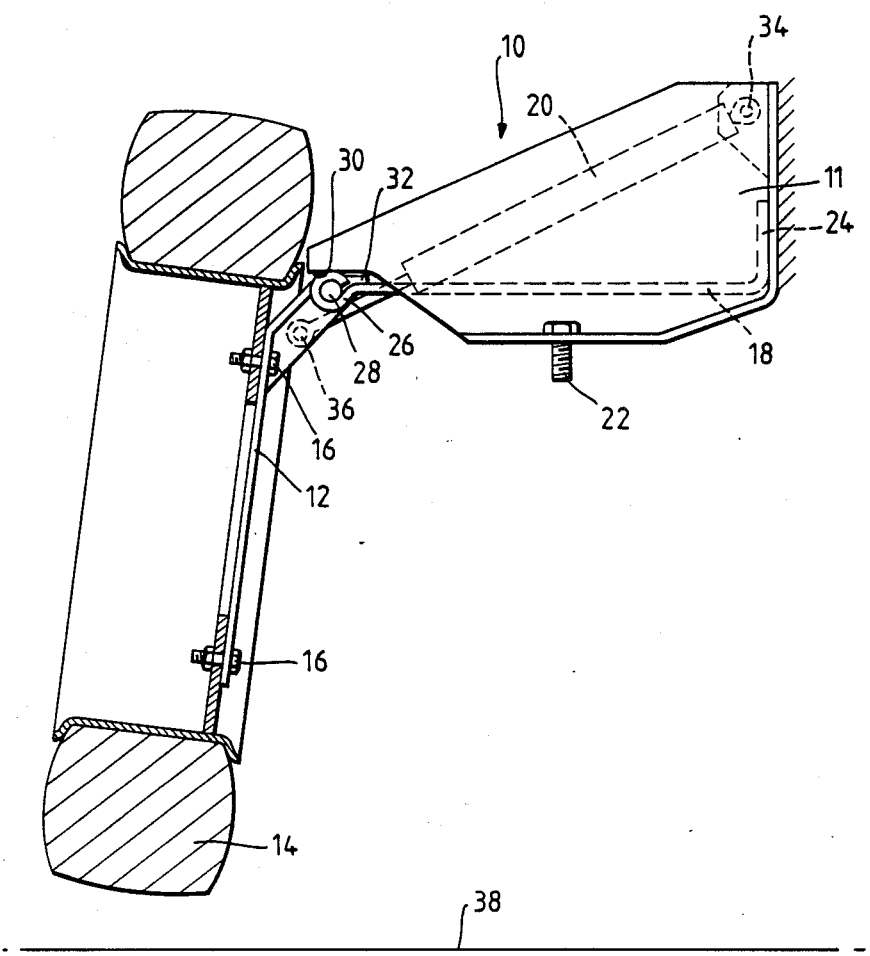
FIG. 3 is a side view of the spare wheel carrier shown in FIG. 1 with the support member at its maximum pivotal angle.

Referring to the drawings, a spare wheel carrier 10 for a motor vehicle is shown. The spare wheel carrier 10 comprises a support structure 11, a support member 12 on which a spare wheel 14 is secured by bolts 16; a resilient member in the form of a pair of quarter elliptic leaf springs 18; and a drive member defined by a double-acting hydraulic ram 20.

In its stored position, as shown in FIG. 1, the support member 12 is in a substantially horizontal plane. To prevent unintentional movement of the support member 12 from the stored position, the support member is secured to the support structure 11 by bolts 22, only one of which is shown. A resilient catch (not shown) can be used as an alternative to the bolts 22, or as well as the bolts 22, to secure the support member 12 to the support structure 11.

The support structure 11 is secured to the underside of the motor vehicle. The quarter elliptic leaf springs 18 are secured at one end 24 to the support structure 11. The opposite ends 26 of the quarter elliptic leaf springs 18 are free. A cylindrical rod 28 extends between the free ends 26 of the quarter elliptic leaf springs 18. The cylindrical rod 28 pivotably supports the support member 12 and thereby defines a pivot axis for the support member. The quarter elliptic leaf springs 18 are mounted such that the free ends 26 are resiliently biased in an upward direction to engage an abutment surface 30 on the support structure 11 when the support member 12 is in its stored position and with the spare wheel 14 secured thereto.

The support member 12 has stop members 32 extending from the support member adjacent its pivot axis, and on the opposite side of the pivot axis to the spare wheel 14. The stop members 32 act as pivot limit means for limiting the angle of movement of the support member 12 relative to the quarter elliptical leaf springs 18 about the pivot axis to a predetermined angle, for example in this case, approximately one hundred degrees. The way in which the stop members 32 act will be described in more detail below.

The double-acting hydraulic ram 20 is pivotally secured to the support structure 11 at one end 34. The other end 36 of the double-acting hydraulic ram 20 is pivotably secured to the support member 12. In this arrangement, the double-acting hydraulic ram 20 either extends to pivot the support member 12 about its pivot axis to move the support member away from its stored position, or the double-acting hydraulic ram contracts to move the support member to its stored position. The double-acting hydraulic ram 20 can be actuated either by using a hand operated pump or by using an existing pressure system on the motor vehicle, where present.

Figure 4:
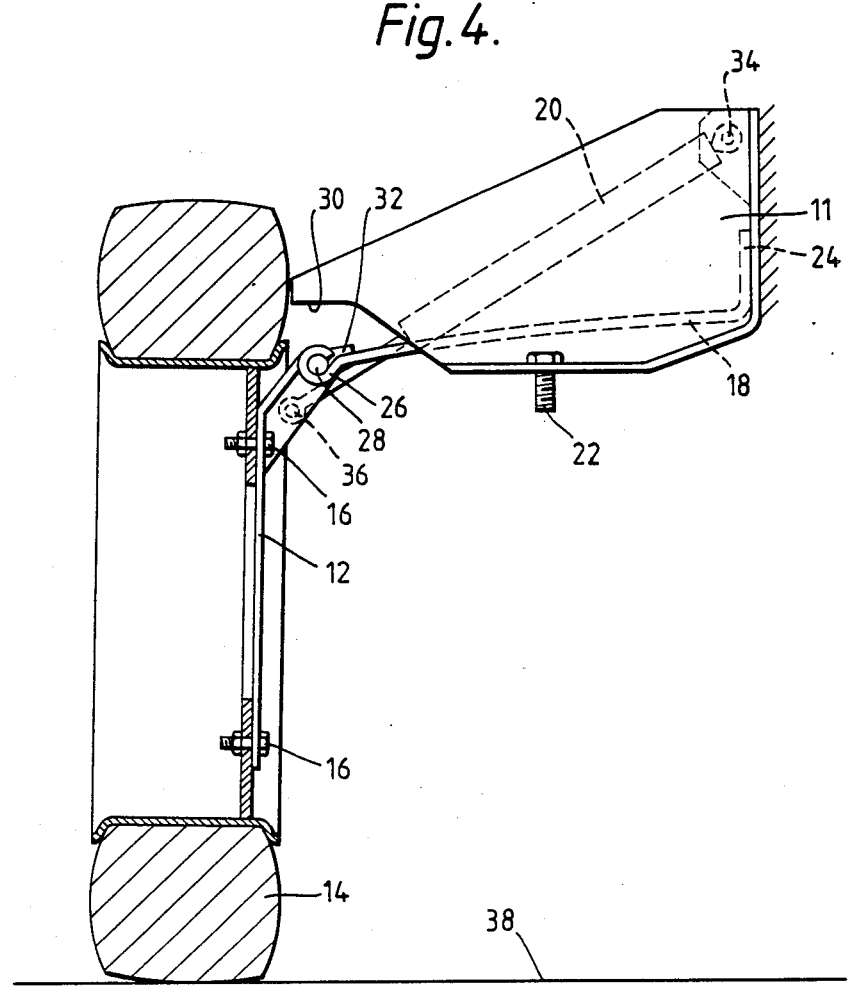
FIG. 4 is a side view of the spare wheel carrier shown in FIG. 1 with the support member in a substantially vertical plane with the spare wheel in contact with the ground.

The mode of operation of the spare wheel carrier 10 of the present invention is as follows. In order to lower the support member 12 (and spare wheel 14) from its stored position (FIG. 1), the bolts 22 are removed and/or the resilient catch (not shown) is released. The double-acting hydraulic ram 20 is then actuated to extend to pivotally move the support member 12 about its pivot axis (FIG. 2). After the support member 12 has passed through a vertical plane, the stop members 32 engage the quarter elliptic leaf springs 18 to prevent further pivotal movement of the support member relative to the quarter elliptic leaf springs (FIG. 3). The stop members 32 are arranged such that they engage the quarter elliptic leaf springs 18 once the support member 12 has traversed through the predetermined angle relative to the quarter elliptic leaf springs. As the double-acting hydraulic ram 20 is further extended, the stop members 32 remain in engagement with the quarter elliptic leaf springs 18 and the free ends 26 of the quarter elliptic leaf springs are forced away from the abutment surface 30 in a substantially downward direction against the bias of the quarter elliptic leaf springs (FIG. 4). This action brings the support member 12 back into a substantially vertical plane and brings the spare wheel 14 into contact with the surface 38 of the ground (FIG. 4). In this position, the spare wheel 14 can be easily removed (by removing the bolts 16) and/or replaced.

A spare wheel can be stored by reversing the above mode of operation.

Although the stored position of the support member 12 has been shown as a substantially horizontal plane, the stored position could be in a plane at any suitable angle to vertical. Further, the arrangement described above with reference to the drawings is only by way of example, and other parts could be used to achieve the same results. For example, the drive member could be a mechanical device, such as a hand crank operated tubular nut and threaded spindle, or a pneumatic device (connected to the vehicle air pressure system where present) rather than the hydraulic ram 20; the pivot limit means could be provided by a chain or other flexible non-extensible element connected between the support member and the support structure rather than by the stop members 32; the resilient member could be provided by a single resilient member rather than the pair of quarter elliptic leaf springs 18, or by coil or rubber springs, or torsion bars, with linkage members supporting the pivot for the pivot axis for the support member, or by a self-regulating air spring (connected to the vehicle air pressure system where present); the abutment surface 30 could be provided by a portion of the underneath of the motor vehicle rather than by the support structure 11; and the bolts 16 could be replaced by a single bolt and support hook or any other suitable means.

We claim:

1. A spare wheel carrier for a motor vehicle comprising a support member on which a spare wheel can be secured and which is pivotable about a pivot axis between a stored position underneath the motor vehicle and a a predetermined position located more than 90° from said stored position; a resilient member secured at one end to the motor vehicle and which, at its opposite free end, carries a pivot for the pivot axis of the support member, an abutment surface proximate the resilient member, the resilient member being biased at its free end in a direction against said abutment surface when the support member is in its stored position; a drive member pivotably secured to the motor vehicle at one end and pivotably secured to the support member at the other end, the drive member being reversibly actuable to move the support member about its pivot axis relative to the resilient member; and pivot limit means for limiting the angle of movement of the support member relative to the resilient member about the pivot axis when said support member has been moved to said predetermined position, the arrangement being such that the support member can be moved from its stored position by actuation of the drive member in a direction which causes the support member to pivot about its pivot axis to said predetermined position until the pivot limit means prevents further pivotal movement of the support member relative to the resilient member, further actuation of the drive member in the same direction causing movement of the free end of the resilient member in a direction away from the abutment surface against the bias of the resilient member to move the support member into a position between said stored position and said predetermined position, and such that actuation of the drive member in the opposite direction causes reversal of the movement of the free end of the resilient member and of the support member.

2. A spare wheel carrier as claimed in claim 1, wherein the stored position of the support member defines a substantially horizontal plane.

3. A spare wheel carrier as claimed in claim 1, wherein the drive member is a double-acting hydraulic ram.

4. A spare wheel carrier as claimed in claim 1, wherein the resilient member is defined by a pair of quarter elliptic leaf springs.

5. A spare wheel carrier as claimed in claim 4, wherein a cylindrical rod extends between the free ends of the quarter elliptic leaf springs, the support member being pivotally mounted on the cylindrical rod which thereby defines the pivotal axis of the support member.

6. A spare wheel carrier as claimed in claim 1, wherein the pivot limit means is defined by a stop member on the support member which can engage the resilient member.

7. A spare wheel carrier as claimed in claim 1, wherein the support member can be secured in the stored position by bolts.

* * * * *